G. T. BECKNELL.
COTTON PICKING MACHINE.
APPLICATION FILED JUNE 7, 1920.
1,382,886.
Patented June 28, 1921.
2 SHEETS—SHEET 1.
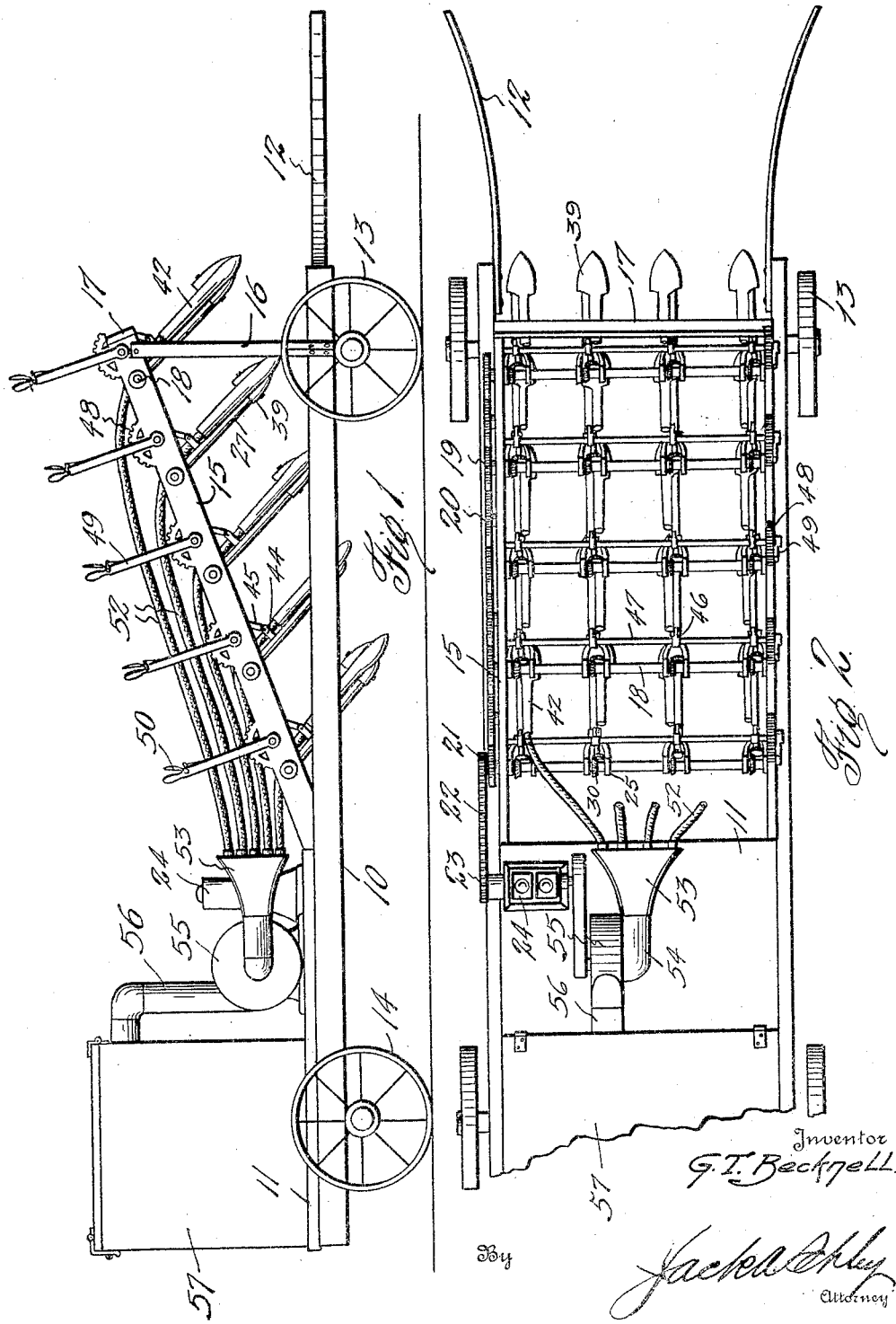

G. T. BECKNELL.
COTTON PICKING MACHINE.
APPLICATION FILED JUNE 7, 1920.
1,382,886.
Patented June 28, 1921.
2 SHEETS—SHEET 2.
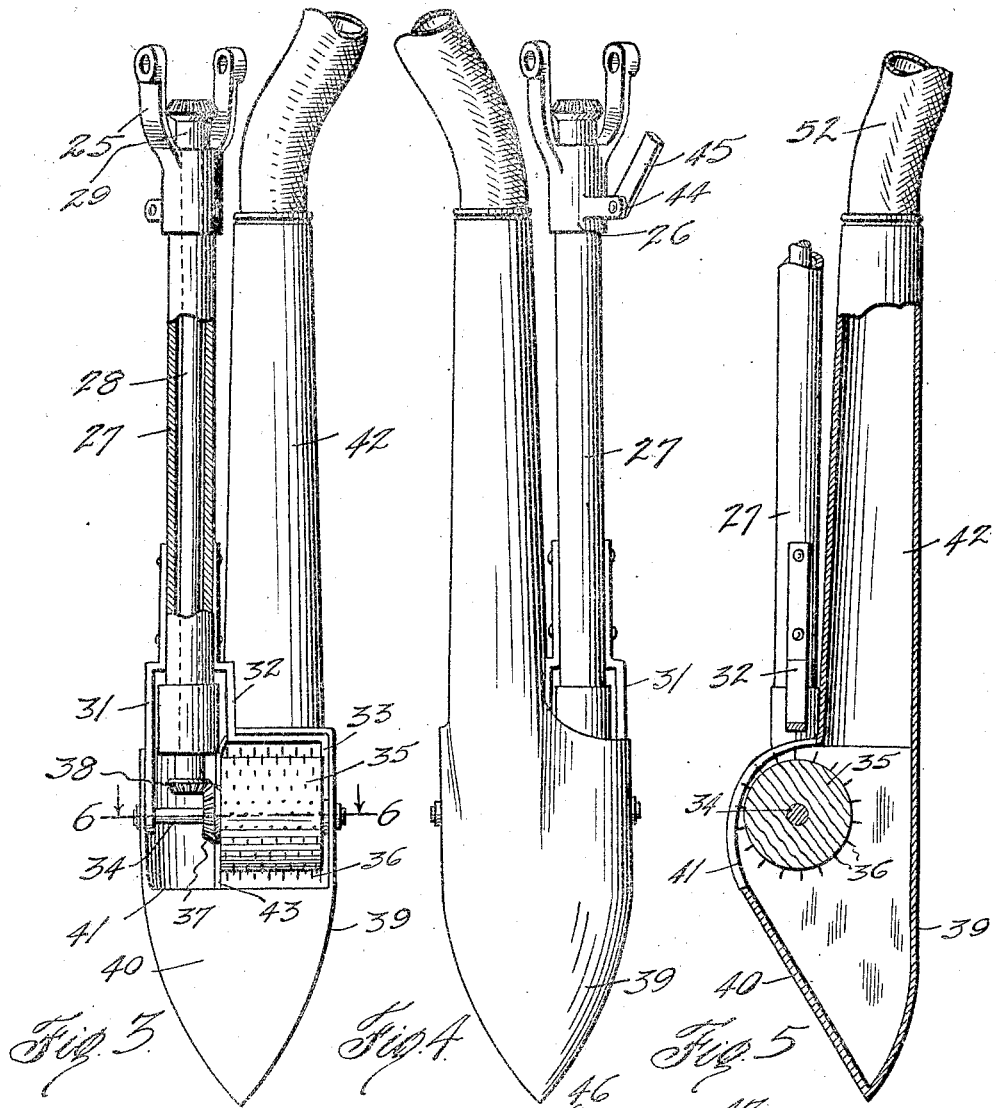
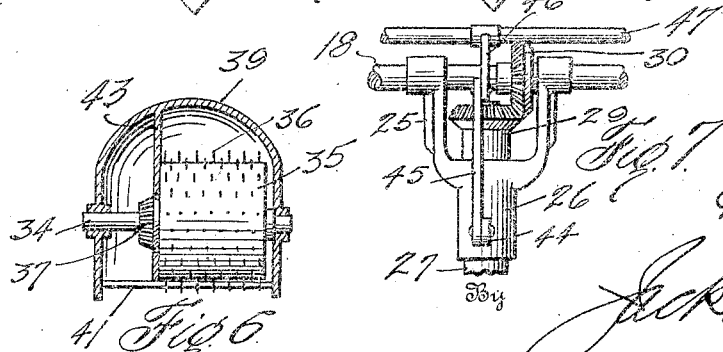
Inventor
G. T. Becknell
By
Attorney

UNITED STATES PATENT OFFICE.

GEORGE T. BECKNELL, OF NEVADA, TEXAS.

COTTON-PICKING MACHINE.

1,382,886.  Specification of Letters Patent.  Patented June 28, 1921.

Application filed June 7, 1920. Serial No. 387,001.

*To all whom it may concern:*

Be it known that I, GEORGE T. BECKNELL, citizen of the United States of America, residing at Nevada, in the county of Collin and State of Texas, have invented certain new and useful Improvements in Cotton-Picking Machines, of which the following is a specification.

This invention relates to new and useful improvements in cotton picking machines.

The object of the invention is to provide a machine for picking cotton and having picking elements arranged at different elevations and spaced apart so that while several plants will be picked at the same time only one portion of a plant will be worked upon at a time, thereby reducing to the minimum the agitation and disturbance of the plant incidental to picking. Another feature resides in picking elements arranged to entangle and remove the cotton from the bur; together with means for creating a suction for conveying the picked cotton from the picking elements.

In carrying out the invention I provide a plurality of adjustable picking elements disposed to operate at different elevations and in sequence. The forward picking elements are arranged at the highest elevation so as to pick the cotton from the top of the first plant encountered. The next succeeding picking elements are arranged to operate on the next bush at a lower elevation and so on until the last and rearmost elements are picking at the lowest portion of the last bush. It will be seen that all of the elements pick the first bush encountered successively as the machine passes the same and in this way the cotton is removed in stages. The invention also involves a novel tongue or picking element which includes a pointed and rounded housing having an opening a short distance from its point through which the points of a picking roller are exposed and engage the cotton. A suction tube feeds from the immediate rear of each roller. The picking elements are pivoted on a supporting frame and adjustable in a vertical arc. Means for driving the rollers is provided and suction tubes lead from the element to a manifold in connection with a suction fan. Other features will be hereinafter pointed out.

The invention will be more readily understood from a reading of the following specification and by reference to the accompanying drawings, in which an example of the invention is shown, and wherein:

Figure 1 is a side elevation of a machine constructed in accordance with my invention, Fig. 2 is a partial plan view of the same, some of the air conductors being omitted, Fig. 3 is a view in elevation of one of the picking elements, Fig. 4 is a reverse view of the same, Fig. 5 is a partial sectional view of the same, Fig. 6 is a cross-sectional view on the line 6—6 of Fig. 3, and Fig. 7 is a front view of the picking element supports and driving means.

In the drawings the numeral 10 designates an elongated frame which has the greater portion of its length open. At the rear portion of the frame a transverse platform 11 is disposed. Outwardly curved guide fingers 12 are provided at the forward end of the frame. The forward end of the frame is suitably supported on ground wheels 13; while the rear end is carried upon ground wheels 14. It is to be understood that the frame of the machine may be propelled in any suitable manner and that any suitable means may be provided for guiding the same. No attempt has been made to illustrate these details.

Upwardly inclined side bars 15 extend from the front edge of the platform 11 and are secured to the sides of the frame 10. The forward ends of the bars 15 are supported on the upper ends of uprights 16 extending upwardly from the front end of the frame 10. The upper ends of the side bars are connected by a transverse bar 17. The uprights 16 and the cross bar 17 together with ends of the bars 15 constitute a forward arch whereby stability is given to the machine. A plurality of transverse drive shafts 18 have their ends mounted in a suitable manner in the side bars 15. On one end of each shaft a gear 19 is fastened and between each pair of gears an idle gear 20 is mounted. A sprocket wheel 21 is mounted on the end of the lowermost shaft 18 and is driven by a sprocket chain 22 from a sprocket 23 which is mounted on the drive shaft of a suitable engine or motor 24 mounted on the platform 11. It is necessary to drive all of the shafts 18 in the same direction and for this reason the idlers 20 are employed as will be obvious. Any suitable form of guiding means could be used however and the form illustrated is not a limitation.

On each drive shaft 18 a plurality of picking elements are hinged by means of yokes 25. As each picking element is a duplicate of the other, a description of one will suffice for both. Each yoke 25 includes a collar 26 in which the upper end of a sleeve 27 is fastened. A counter shaft 28 extends through the sleeve and has fastened on its upper end and within the yoke, a beveled pinion 29 which meshes with a beveled pinion 30 on the drive shaft 18 to which the yoke is hinged. An off-set bracket member 31 is fastened to one side of the lower portion of the sleeve, while a second off-set bracket 32 is fastened to the other side of the sleeve. The bracket 32 has an angular hanger 33. A transverse roller shaft 34 is supported in the lower ends of the bracket 31 and the hanger 33 as is best shown in Fig. 3.

On the shaft 34 a picking roller or drum 35 is fastened and disposed within the hanger 33. The roller has a plurality of radial picking points 36 disposed preferably, but not necessarily, in rows longitudinally on the face of said roller. These points should be very sharp but need not project more than one-half an inch and preferably a less distance. A beveled pinion 37 is mounted on the shaft 34 for revolving the roller and is driven by a beveled pinion 38 mounted on the lower end of the shaft 28. To the bracket 31 and the hanger 33 is attached a housing 39 which has a substantially flat face 40 having its upper end terminating at a transverse opening 41 through which the picking roller is exposed. The back of the housing which is rounded is merged into a suction tube 42 extending upwardly to a point adjacent the yokes. The lower end of the housing is pointed so as to more readily enter between the leaves and limbs of the cotton plants. In the housing a longitudinal partition 43 is arranged for separating the pinions 37 and 38 from the picking roller 35 and thus preventing the cotton lint from clogging the pinions.

It is obvious that the picking elements must be supported and for carrying this out each collar 26 is provided with a radial lug 44 which is pivoted to the lower end of a link 45. As is well shown in Fig. 7 each link has its upper end pivoted to the outer end of an arm 46 which is fastened on a transverse shaft 47. The shafts 47 are supported in the side bars 15, each being concentric to a locking segment 48 mounted on one of the bars 15 and carrying an upright adjusting lever 49 having a locking plunger 50 engaging said segment. It will be seen that several picking elements are mounted on each shaft 18 and by swinging the adjusting lever 49 the shaft 47 which is connected with said element will be swung thereby raising or lowering the picking elements connected therewith. In the drawings I have shown four elements to each shaft and have included five shafts at different elevations, the highest one being at the upper ends of the bars 15 and the lowest at the lower end of said bars. It is also pointed out that two picking elements are arranged on each side of the center of the machine which is supposed to be propelled along the rows so that the center of the machine will pass over the center of the plants. It is pointed out that the elements are rotatably adjustable in a suitable manner in the collars 26 and are preferably disposed with their faces 40 directed toward the cotton plant. This will cause the elements on opposite sides of the center to be directed toward each other as will be obvious. Good results may be had by disposing the faces 40 at an angle to the perpendicular so as to incline toward the center or stalk of the plant on each side thereof. In this position the faces 40 and the openings 41 together with the picking rollers 35 simulate the human hand as it is presented to the cotton in picking the same.

From the upper end of each suction tube 42 a flexible conductor such as a hose 52 extends to a manifold 53 which is reduced and connected to an elbow 54 entering the sides of a suction fan 55 which is suitably driven by the motor 24. A discharge pipe 56 leads from the fan to a collection receptacle 57 mounted on the rear end of the platform 11. It will be seen that the flexible conductors convey the cotton lint and also permit the picking elements to be adjusted freely. It is pointed out that the picking elements are preferably directed forwardly and downwardly as is best shown in Fig. 1. It will be seen that the pointed ends of the housings will readily enter the plant and are supported at such elevations as to enter a plant in sequence; each element however acting on a plant at the same time. The elements may be arranged so that those in each row operate on a different plant or so that those in adjacent rows may operate on the same plant but at a different elevation.

In using the machine it is suitably propelled along the row so that the fingers 12 pass on each side of the cotton plant and tend to guide the same to the center of the machine. Motion is imparted to the shaft 18 so as to rotate the counter shafts 28 whereby the rollers 35 are revolved. It will be seen that the uppermost picking elements, which are those hinged to the top shaft 18 will encounter the first plant and will enter between the branches and leaves at the top portion of the plant only. As the machine moves forward the second row of picking elements will enter the same plant at a lower elevation. This will continue, each successive row of picking elements entering the plant at a lower elevation until the last row of elements has entered the plant and the same has been picked clean. It will be seen that after the machine begins operating each row of picking elements will be working on cotton plants but not on the same plant at the same time; this tends to reduce agitation of the plants to a minimum and will tend to preserve the green and unmature bolls. It will be seen that the smooth faces 40 will pass over the cotton locks and tend to guide the same to the opening 41 so that the picking points 36 may entangle themselves in the cotton lint and pull the same from the bur. The suction created by the fan 55 will operate through the tube 42 to convey the picked cotton to the hose 52 from which it will be conveyed into the elbow 54 from the manifold 53 and finally through the discharge pipe 56 into the receptacle 57. The cotton will be easily freed from the picking points and it is believed will be efficiently and expeditiously handled.

What I claim, is:

1. In a cotton picking machine, the combination with a supporting frame, of a plurality of longitudinal sets of picking elements supported by the frame, each element embodying a rotatable picking member, the picking members in each set being longitudinally spaced, the rear extremity of the forward member being arranged wholly in advance of the forward extremity of the next succeeding picking member and spaced therefrom such a distance that each picking member operates upon one plant only at one time, the picking members being arranged at different elevations, whereby all of the said elements are adapted to simultaneously operate upon different plants, and means for actuating the picking members.

2. In a cotton picking machine, the combination with a supporting frame, of a plurality of longitudinal sets of picking elements supported by the frame, each element embodying a rotatable picking member, the picking members in each set being longitudinally spaced, the rear extremity of the forward member being arranged wholly in advance of the forward extremity of the next succeeding picking member and spaced therefrom such a distance that each picking member operates upon one plant only at one time, the picking members being arranged at different elevations, whereby all of the said elements are adapted to simultaneously operate upon different plants, means for actuating the picking members, and suction means to convey the picked cotton from the rotatable picking members.

3. In a cotton picking machine, the combination of a wheel supported frame, of a plurality of sets of cotton picking elements supported at different elevations and spaced longitudinally of the machine so as to operate upon a plurality of different cotton plants at different elevations at the same time and operating upon each plant at one elevation only, each element including a rotating picking member, means for creating a suction mounted on the frame, and a flexible conductor leading from each picking element to the suction means for conveying the picked cotton thereto.

4. In a cotton picking machine, the combination of a wheel supported frame, of a plurality of sets of cotton picking elements supported at different elevations and spaced longitudinally of the machine so as to operate upon a plurality of different cotton plants at different elevations at the same time and operating upon each plant at one elevation only, each element including a rotating picking member, means for creating a suction mounted on the frame, a flexible conductor leading from each picking element to the suction means for conveying the picked cotton thereto, and means for adjusting the cotton picking element vertically.

5. In a cotton picking mechanism, a wheeled frame, a longitudinal set of picking elements supported by the frame, the elements in the set being longitudinally spaced and each element arranged at a different elevation, whereby all of said elements are adapted to simultaneously operate upon different cotton plants, and each element operates upon each plant at one elevation only, and means for actuating the elements.

6. In a cotton picking machine, a wheeled frame, a plurality of spaced transverse driving shafts carried by the frame, means to rotate said shafts, picking elements pivotally mounted upon the driving shafts to be swung vertically thereon and being driven by the driving shafts, and means to raise and lower the elements.

7. In a cotton picking machine, the combination of a wheeled supporting frame, a longitudinal set of transverse driving shafts carried by the frame, said shafts being longitudinally spaced upon the frame and arranged in an inclined plane, and picking elements carried by said shafts and driven by the same.

8. In a cotton picking machine, a wheeled frame, transverse driving shafts connected therewith, yokes pivoted upon the shafts to swing vertically thereon and carrying thereon sleeves, a nozzle secured to each sleeve, a rotatable picking element in each nozzle, a shaft extending longitudinally of the sleeve and driving the rotatable picking element, driving connecting means between the shaft in the sleeve and the adjacent transverse shaft, and a suction device connected with the nozzle.

In testimony whereof I affix my signature.

GEORGE T. BECKNELL.